Nov. 21, 1967 W. A. RAY 3,353,353
ELECTRO-HYDRAULIC ACTUATOR MECHANISM
Filed March 30, 1966 3 Sheets-Sheet 1

WILLIAM A. RAY
INVENTOR.

BY Gordon H. Olson
ATTORNEY

WILLIAM A. RAY
INVENTOR.

BY Gordon H. Olson
ATTORNEY

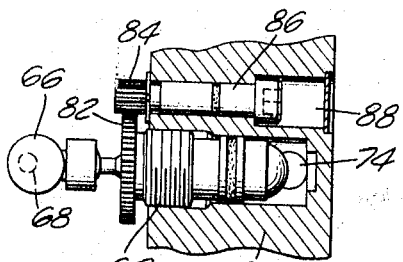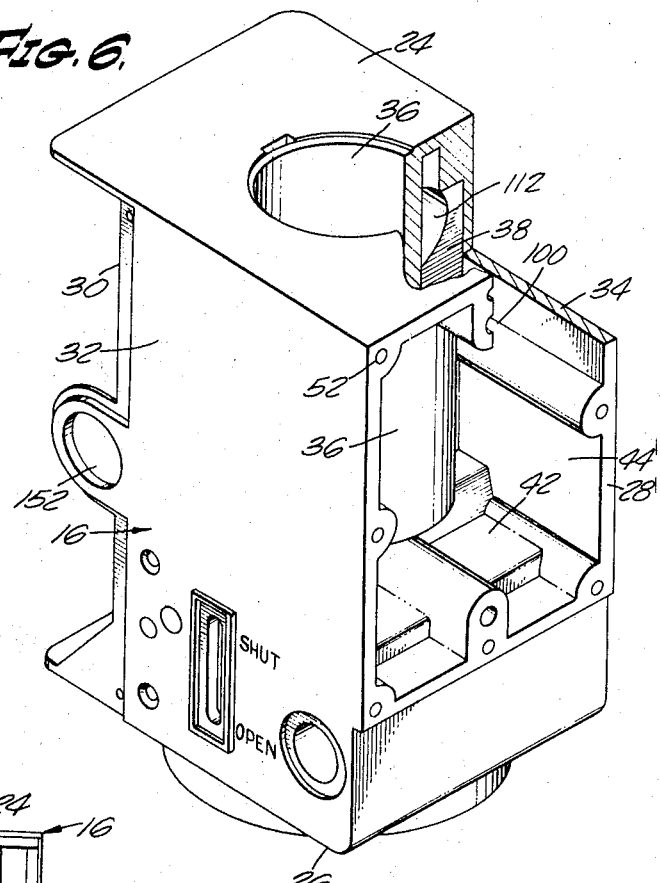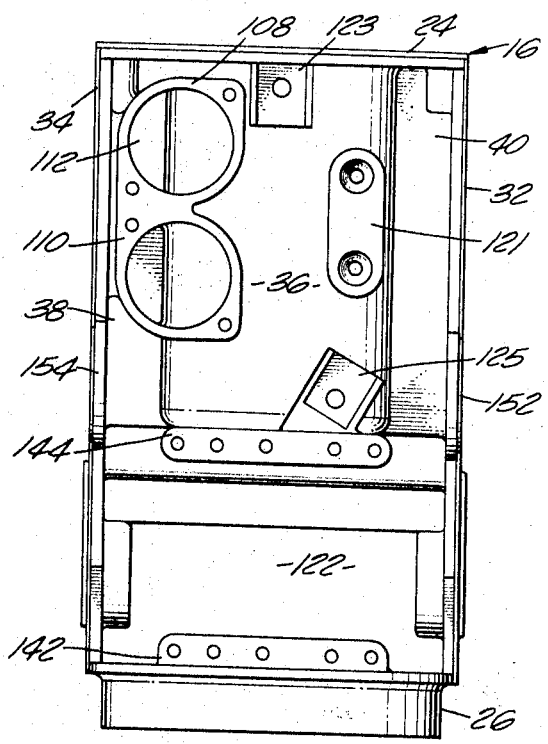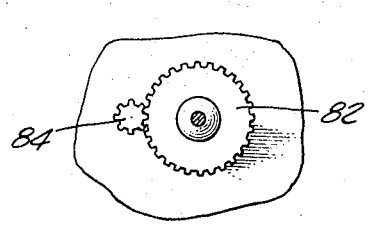

| United States Patent Office | 3,353,353 |
|---|---|
| | Patented Nov. 21, 1967 |

3,353,353
ELECTRO-HYDRAULIC ACTUATOR MECHANISM
William Alton Ray, North Hollywood, Calif., assignor to International Telephone and Telegraph Corporation, New York, N.Y., a corporation of Maryland
Filed Mar. 30, 1966, Ser. No. 538,827
11 Claims. (Cl. 60—52)

This invention relates to a fluid hydraulic actuator mechanism of the type employing an electric motor driving a pump which furnishes fluid under pressure to drive a piston and actuator arrangement, which in turn may be employed to operate various devices such as valves or other controls.

In a typical operation of such apparatus, the electric motor may be actuated in response to an external condition such as temperature or pressure. Fluid under pressure supplied by the pump then causes the actuator piston to move in one direction in opposition to a spring. When the piston reaches its end position, it may operate a switch to deenergize the motor and a relief valve may be subsequently open to relieve the pressure permitting the fluid to flow into a reservoir. In another arrangement, the actuator piston may be controlled so as to remain in any intermediate position between fully opened or fully closed. This normally requires that the motor and pump be continuously operating.

Hydraulic apparatus of this type is employed to operate a wide variety of industrial devices and as such are in competition with other means for providing powerized movement of an actuator. For example, pneumatically operated devices are widely employed and electro-mechanical arrangements are also extensively used. Accordingly, in view of the highly competitive nature of the business major improvements in cost and quality are very significant.

It is a primary object of this invention to provide an improved low cost construction for an integrated electro-hydraulic actuator mechanism.

It is a further object of this invention to provide such a mechanism employing a minimum number of parts to obtain a strong rugged construction which minimizes manufacturing and assembling operations.

It is a further object of this invention to provide such a mechanism in which the electrical components and the means for providing pressurized fluid are readily accessible to thereby contribute to the ease of repairing such a device.

Another object of the invention is to provide such an improved mechanism with a unique and versatile design that is adapted to receive additional operating controls as required and can be readily manufactured in a variety of sizes.

The primary element of the improved construction of the invention is a main casting having top, bottom and side walls, together with a cylinder formed integrally in a central portion of the casting for receiving an actuator piston. The upper end of the cylinder opens to the top wall of the casting and a cover is removably secured to the casting for closing the upper end of the cylinder. To one side of the cylinder there is formed within the casting an enlarged cavity which opens to one of the side walls of the casting. A second main member is a generally cup-shaped housing having its open end removably secured to the casting so that the cavity and the space within the housing are connected to form a hydraulic fluid reservoir. An electric motor and a pump driven thereby are secured to the housing and positioned within the reservoir to be emersed in hydraulic fluid. Suitable ducts are formed in the casting in the housing to connect the output of the pump to one end of the cylinder. With such an arrangement, the cavity formed in the casting and the housing uniquely combine to form the fluid reservoir and the pump and motor are readily accessible by simply removing the housing from the casting. The main casting performs a variety of functions within the actuator mechanism and hence, contributes greatly to the reduced cost of the apparatus.

The various electrical connections and controls normally associated with such an actuator mechanism may be conveniently mounted on the side of the casting opposite from the motor and pump housing, thereby giving balance to the unit and facilitating the ease of making such connections. The overall construction of the improved mechanism has resulted in very significant decreased costs and other benefits.

Further features and advantages of the construction of the invention will become apparent with reference to the following detailed specification and drawings in which:

FIG. 4 is a fragmentary sectionalized view of the pump shown in FIG. 4;

FIG. 5 is a showing of further detail of the pump;

FIG. 6 is a perspective partially cut away view of the main casting of the mechanism;

FIG. 7 is a side elevational view of the casting of FIG. 6 showing the side to which the electrical connections are made.

Figure 1:
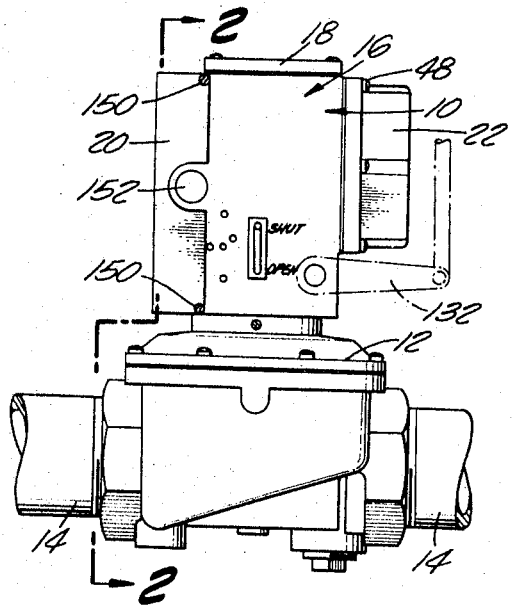
FIG. 1 is a side elevational view of the electro-hydraulic actuator mechanism of the invention when employed for operating a valve.
Figure 2:
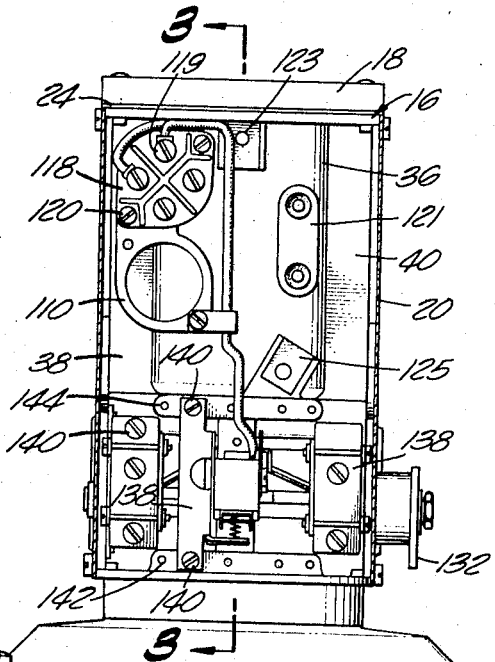
FIG. 2 is a showing of the structure of FIG. 1 along line 2—2.

Referring now to FIG. 1, the actuator of the invention is shown mounted on a valve body 12 positioned in a fluid conducting pipe 14. While the actuator 10 could be supported in some other fashion, it is typically positioned as shown carried directly by the valve being controlled. With such an arragement, the actuator mechanism can be easily mounted in the desired location requiring only a source of electrical energy to be operated. The basic elements of the actuator mechanism include a large centrally positioned casting 16, a cover 18 secured to the top of the casting, a cover 20 secured to the left side of the casting to enclose the electrical components, and a pump and motor housing 22 mounted on the right side of the casting 16.

Refer now to FIGS. 2, 3, 6 and 7 for more detailed illustration of the constructional aspects of the actuator mechanism. The main casting 16 which is preferably made of aluminum, serves a multiplicity of functions and one of the main features of the invention is the unique manner in which these various functions are combined into a single integrated casting. The casting may be seen to have a generally rectangular cross-section including a top wall 24, a bottom wall 26 and side walls 28, 30, 32 and 34. Centrally positioned within the casting, there is formed a cylinder 36 which opens at its upper end to top wall 24. Side walls 32 and 34 are generally solid or imperforate and form the primary structural elements of the casting. To adequately support the cylinder, partitions 38 and 40, as seen in FIGS. 6 and 7, extend on opposite sides from the outer surface of cylinder 36 to adjacent solid walls 34 and 32 respectively. An internal wall 42 extends from the base of the partitions 38 and 40 and the bottom of cylinder 36 outwardly to side wall 28.

As can be seen, side wall 28 is generally open above internal wall 42 with the result that an enlarged cavity 44 is formed in the casting on one side of cylinder 36. This cavity is defined by portions of the top wall 24, side walls 32 and 34, internal wall 42, and about one half of the exterior surface of cylinder 36. In accordance with the invention, cavity 44 cooperates with the generally cup-shaped housing 22 which is mounted by a plurality of fasteners 48 extending through lugs formed integral with the side walls of the housing and being threadably received within recesses 52 formed in casting side wall 28 so that the open interior of the housing is in fluid communication with the cavity. The cavity 44 and the interior of housing 22 combine to form a fluid reservoir for the hydraulic system of the actuator mechanism. A suitable seal or gasket 54 positioned between the housing 22 and side wall 28 of the main casting prevents leakage from the reservoir in that area.

Figure 3:
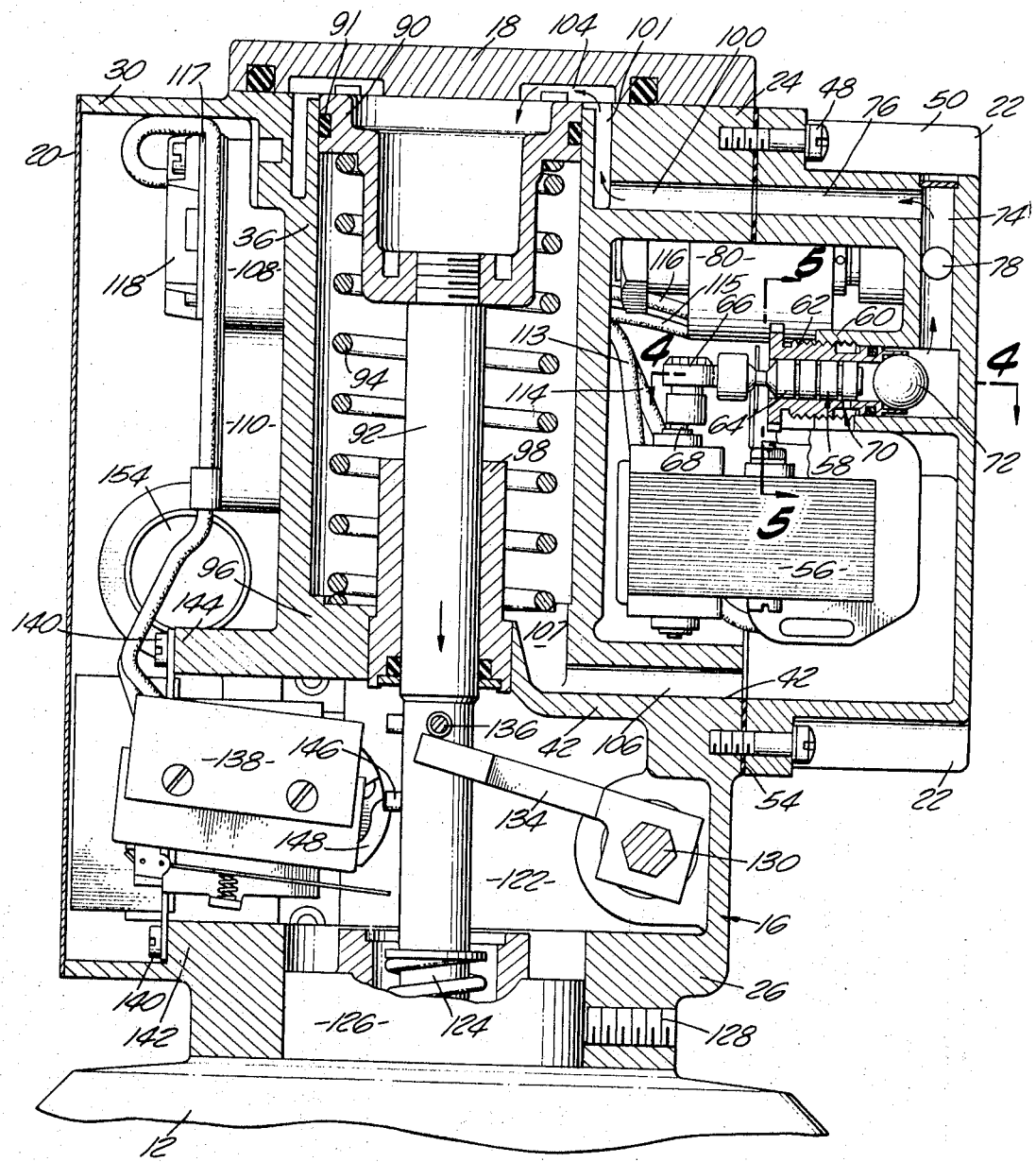
FIG. 3 is a cross-sectional view of the actuator mechanism along line 3—3 of FIG. 2.

As shown in FIG. 3, there is provided a suitable electric motor 56 driving a pump 58 both of which are positioned within the reservoir to be submerged in the hydraulic fluid. The motor 56 is preferably secured to the end wall of housing 22 by suitable fastening means so that the motor and pump are easy to mount and are readily accessible for repair by simply removing housing 22 from casting 16. Note that the motor compactly extends well into the casting cavity 44 with the result that essentially the entire reservoir space is required to adequately house the pump and the motor, but yet the spaces in and around the pump and motor provide adequate volume to accommodate the necessary hydraulic fluid.

The pump 58 includes a cylinder receiving socket 60 formed in the end wall of housing 22 and the pump cylinder 62 is threadably received therein. Within the cylinder 62 there is positioned a pump piston 64 which is reciprocated by an eccentric 66 mounted on the motor drive shaft 68. A pump inlet 70, indicated by the arrow in the side wall of cylinder 62, is in direct communication with the main reservoir. Liquid drawn in through inlet 70 is forced past one way valve 72 into a duct 74 integrally formed in the end wall of housing 22 and interconnected with a duct 76 integrally formed with a side wall of the housing 22.

A bypass duct 78 intersects duct 74 and the flow through the bypass may be controlled by a suitable bypass valve generally shown at 80. The outer end of pump cylinder 62 is formed with gear teeth as best seen in FIGS. 4 and 5. These gear teeth 82 cooperate with a pinion gear 84 mounted on a shaft 86 which is accessible through an opening 88 in the end wall of the housing. It will be understood that the output of the pump may be varied by adjusting the axial position of the pump cylinder within pump socket 60.

Returning now to the construction within the main casting, there is shown in FIG. 3 a piston 90 carrying a piston ring 91 slidably mounted within cylinder 36. A coil spring 94 having one end engaging the lower surface of piston 90 and its other end engaging the bottom wall 96 of the cylinder urges the piston to the top of the cylinder. A piston or actuator rod 92 is threadably secured to piston 90 and extends downwardly through a suitable bushing 98 forming an opening in the bottom wall of cylinder 36. The piston rod 92 extends further into the lower portion of the actuator mechanism as will be described in more detail hereinafter.

With the arrangement as shown, the piston normally in its upper position and therefore must be forced downwardly by the hydraulic pressurized fluid. As shown in FIG. 3, the pressurized fluid duct 76 within the housing 22 is aligned with a similar duct 100 formed integral with the casting top wall 24. Duct 100 interconnects with a vertically extending duct 101 formed in the casting adjacent the wall of cylinder 36 and which communicates with a duct 104 formed integrally in the cover member 18 closing the top of cylinder 36. The cover 18 is, of course, removably secured to the casting top wall 24 to permit ready access to the interior of the cylinder 36. Thus, it can be seen that by energizing pump motor 56, pressurized fluid may be ducted to the space above piston 90 so that the piston and actuator rod 92 may be forced downwardly against the urging of spring 94.

To permit the piston 90 to return to its upper position as shown in FIG. 3, electrically operated bypass valve 80 may be actuated to open the bypass allowing the pressurized fluid to escape into the reservoir. Actually, there are several different bypass control arrangements which may be employed and each are adapted to fit within the basic casting motor housing construction disclosed. For example, in the arrangement shown the actuator rod 92 is to be either in an "on" or an "off" condition. That is, either in a fully open or a fully closed condition. To attain a fully actuated position, the motor is energized and then probably deenergized with the actuator remaining actuated. The actuator is allowed to return to its at rest position by opening the bypass valve. Another on-off arrangement simply includes a fixed bypass orifice and the motor would be kept continuously in operation when the actuator is in a fully actuated position. When the actuator is to be returned to its at rest position, the pump motor could be deenergized and the spring 94 would return the actuator to its at rest position.

A further modification which might be employed is that of a so-called proportioning bypass control wherein the bypass rate can be selected as desired. With such arrangement, the actuator may be held at any given axial position by leaving the motor continuously operating thereby controlling the bypass rate. Deenergizing the pump motor would naturally cause the actuator to return to its at rest position.

Figure 8:
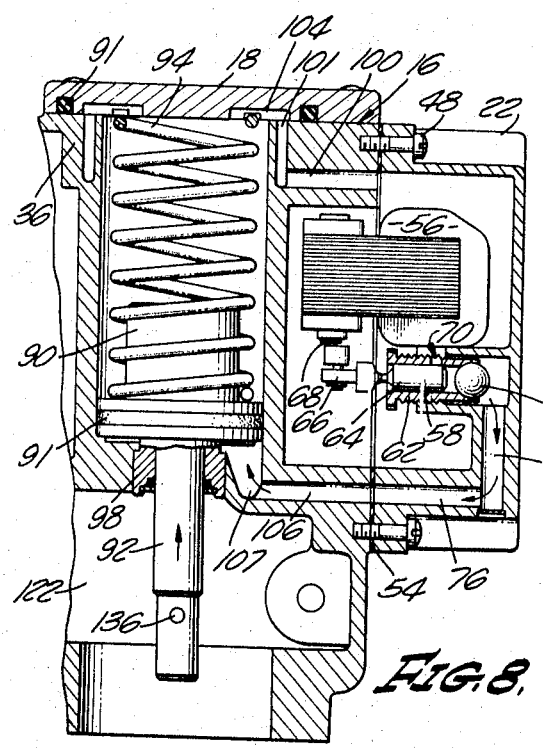
FIG. 8 is a cross-sectional view of a portion of the actuator mechanism showing the pump inverted from that position shown in FIG. 3.

In addition to the fluid duct 100 formed adjacent the upper casting wall 24, there is provided a duct 106 formed integral with internal wall 42 extending from an opening 107 in the bottom of cylinder 36 outwardly to side wall 28. The purpose for duct 106 will be readily apparent by reference to FIG. 8 wherein the motor housing 22 is shown secured to casting 16 in a position inverted from that shown in FIG. 3. In this position, it can be seen that duct 76 in housing 22 is in direct communication with duct 106 leading to the lower portion of cylinder 36. Accordingly, piston 90 and spring 94 may be reversed from the position shown in FIG. 3 so that it is in unactuated position in the lower portion of the cylinder and the piston is thus actuated by being forced upwardly against the urging of spring 94. Thus, the further versatility of the construction of the actuator mechanism can be appreciated.

Basically, the hydraulic mechanism of the actuator structure has been so far described and it should be noted that all of the elements are generally positioned on the right hand side of the mechanism as seen in FIG. 3. To balance this arrangement and to provide ready accessibility to common components of the structure all of the electrical connections of the mechanism are on the left hand side of the casting 16. Turning first to FIG. 7 it can be seen that side wall 30 is generally open so that the outer surface of cylinder 36 is generally visible in the top portion of the casting. On the left hand side of the casting as viewed in FIG. 7 there is integrally formed a pair of tubular portions 108 and 110 which extend outwardly from partition wall 38 and a portion of the outer surface of cylinder 36 and are generally flush with side wall 30.

The portion of partition wall 38 defined by tubular portion 108 has been removed to form a hole 112. The hole 112 provides an entry for the electrical leads 113 and 114 to motor 56 and leads 115 and 116 to the bypass valve. The leads are terminated in a cover member 118 which closes the outer end of tubular portion 108. For example, the leads 113 to 116 may be connected to the necessary terminal screws 119 shown extending into cap 118 in FIG. 2. The connections through the cap 118 should, of course, be suitably sealed to prevent leakage from the reservoir. Similarly, a suitable gasket or seal 117 is compressed between the end surface of tubular portion 108 and cover member 118 by threaded fasteners 120.

Tubular portion 110 is provided as a conduit for additional electrical connections which may be required. For example, if the proportioning control referred to above is to be attached to the casting, the portion of partition 38 defined by tubular portion 110 may be removed to permit the additional leads to be inserted into the fluid reservoir, to be connected to the control which may be mounted on the top wall of casting 16.

On the right hand side of the casting as seen in FIG. 7, there is provided an integrally formed lug 121 which may be employed to mount a capacitor or other electrical component which may be required for the particular motor selected. Similarly, additional lugs or bosses 123 and 125 may be formed integral with casting 16 to provide convenient mounting surfaces for electrical components.

Referring now to the lower portion of the mechanism, it may be seen that the unique casting of the invention is formed with a compartment 122 beneath cylinder 36; cavity 44 and the side of the casting to which the electrical connections are mounted. The actuator rod 92 extends into compartment 122 and out the bottom wall of the casting to engage a valve stem 124 in a valve body 12, as seen in FIG. 3. Note that the bottom of casting 26 is formed in the shape of a circular collar to slip over the upper end 126 of the valve. The hydraulic actuator of the invention may be secured in this position by a suitable setscrew 128 extending through the collar.

Compartment 122 provides convenient space into which various control elements may be positioned to cooperate with the actuator rod extending therethrough. On the right hand side of compartment 122 as viewed in FIG. 3, there is positioned a damper shaft 130 which as seen in FIG. 1 extends to the exterior of the casting and carries a lever 132 which may be connected to a furnace damper in the event the actuator is employed to control a fuel valve for a combustion burner. It is desirable that the damper be operated simultaneously with the fuel valve. Hence, there is provided an arm 134 attached to damper shaft 130 and extending towards a linking pin 136 which extends perpendicular to actuator rod 92 and is carried by the rod. The bifurcated end of arm 134 extends on either side of rod 92 to be engaged by pin 136 as the actuator rod 92 moves downwardly as viewed in FIG. 3. Naturally, the damper mechanism may be arranged as desired to open or close in the desired relationship with respect to the valve, and it may be provided with positive actuation in either direction or may be moved by the actuator rod in one direction and a spring mechanism in the opposite direction. Also positioned in compartment 122, if desired, is one or more switches 138. Such switches may be conveniently mounted in the position shown by suitable threaded fasteners 140 extending through the switch and into threaded apertures formed in a pair of outwardly extending bosses 142 and 144 formed integral with the main casting 16.

The switch 138 may also be connected to be operated by the movement of actuator rod 92. More specifically, in FIG. 3 a linking projection 146 from actuator rod 92 is shown engaging an operating lever 148 extending outwardly from switch 138 in a fashion such that downward movement of the actuator rod will actuate the switch. Similarly, any number of switches positioned within compart 122 and mounted on bosses 142 and 144 may be actuated by movement of actuator rod 92. The linking connections to the switches from the actuator rod 92 may be by means of special projections such as projection 146 or may be by means of linking arms cooperating with horizontally oriented pin 136.

It will be understood that various operations may be performed by switches controlled by movement of the actuator and that the particular functions do not form a part of this invention. However, the significant aspect of the arrangement is the convenience and simple manner by which the switches may be mounted to the main casting 16. To gain access to the electrical components of the actuator mechanism, it is only necessary to remove cover 20 secured to casting 116 by a plurality of screws 150. Incidentally, when the cover 20 is employed, the various electrical means to the actuator mechanism will extend through one of two apertures 152 and 154 formed integrally with the main casting.

From the foregoing, it will become apparent that various changes and modifications to the construction of the invention will become apparent to one skilled in the art. Accordingly, it is intended that all such variations and modifications that fall in the true spirit and scope of the invention are included in the appended claims.

What is claimed is:

1. An electro-hydraulic actuator mechanism comprising:
   a main casting having top, bottom and side walls,
   a cylinder for receiving an actuator piston integrally formed in a central portion of said casting having an upper end which opens to said top wall,
   a cover removably secured to said casting closing the upper end of said cylinder,
   an enclosed cavity formed in said casting on one side of said cylinder opening to one of said side walls;
   a generally cup-shaped housing having its open end removably secured to said one side wall so that said cavity and the space within the housing are connected to form a hydraulic fluid reservoir;
   an electric motor and a hydraulic pump driven thereby secured to said housing and positioned within said reservoir;
   and duct means in said housing and said casting for ducting fluid from said pump to said cylinder and from the cylinder to said reservoir.

2. The invention of claim 1 including means formed integral with said casting on the side of said cylinder opposite from said cavity for mounting electrical connectors therein:
   partition means extending between said cylinder and a central portion of one of said side walls and forming one of the surfaces defining said cavity;
   said electrical connectors including power leads for said electric motor extending through a hole in said partition means to reach said motor;
   and means engaging said leads and said casting for mounting the leads and preventing fluid leakage from said reservoir around said leads.

3. The invention of claim 2 in which said integral mounting means includes a tubular portion in communication with said hole and extending outwardly from said particular means and said cylinder and terminating near the casting side wall opposite from the cavity, a terminal cap having said leads attached thereto, and means securing said cap to the outer end of said tubular portion to effectievly support the leads and prevent fluid leakage out of said tubular portion.

4. The invention of claim 3 including a second tubular portion formed integral with and adjacent the other tubular portion, said second portion being adapted to house additional electrical connectors to be extended into said reservoir.

5. The invention of claim 1 in which said duct means includes a duct formed integral with said casting and extending into one end of said cylinder, and a duct formed integral with a side wall of said housing and being aligned with the duct formed in the casting for conducting fluid to said one end of the cylinder.

6. The invention of claim 1 in which said casting side walls include two walls positioned on opposite sides of said cylinder, being substantially imperforate and the other two walls being substantially open;
   said casting further including partition means extending on opposite sides of said cylinder to said imperforate side walls, and internal wall means extending generally horizontally from the bottom of said cylinder and the bottom of said partion means toward said housing;

said partion means and said internal wall means together with portions of said cylinder and portions of said top and said imperforate side walls defining said cavity.

7. The invention of claim 6 in which the duct means within said casting includes a duct formed integral with said casting internal wall means and extending from the bottom of said cylinder to said one side wall and further includes a duct formed integral with said casting top wall and extending from the top of the cylinder to said one side wall, and said housing being adapted to be secured to said casting in either of two-positions wherein said housing duct is aligned with either the duct in said top wall or the duct adjacent said internal wall so that pressurized fluid may be ducted to and from the particular end of said cylinder desired by properly securing the housing to the casting.

8. The invention of claim 1 including a compartment formed in said casting beneath said cylinder and said cavity;

an actuator piston slidably mounted within said cylinder;

a spring in said cylinder urging said piston in one direction;

an actuator rod secured to said piston and extending downwardly through the bottom wall of said cylinder into said compartment;

control means mounted on said casting;

and linking means mounted on the portion of said rod located in said compartment for cooperating with the control means to operate said control means as said actuator rod is moved.

9. The invention of claim 8 in which said linking means is a horizontally extending pin and said control means includes a damper mechanism comprising: a shaft rotatably mounted in said compartment, an arm mounted on said shaft and extending towards and engaging said pin so that axial movement of said rod will move said pin and pivot said arm causing said shaft to rotate, and a lever attached to one end of said shaft outside of said casting operating a damper control.

10. The invention of claim 9 including a vertically extending window formed in a side wall of said casting adjacent an end of said pin to permit visual observance of the position of the pin as an indication of the position of the actuator rod.

11. The invention of claim 8 including means formed integral with said casting near said compartment for mounting said control means, said control means comprising at least one electrical switch having means engaging said linking means to operate the switch.

References Cited

UNITED STATES PATENTS

| | | | |
|---|---|---|---|
| 1,984,558 | 12/1934 | White | 60—52 |
| 2,942,581 | 6/1960 | Gaffney | 60—52 |
| 3,050,257 | 8/1962 | Sweger et al. | 60—52 X |
| 3,175,500 | 3/1965 | Zeigler | 60—52 X |

EDGAR W. GEOGHEGAN, *Primary Examiner.*